(12) United States Patent
Hwang et al.

(10) Patent No.: US 10,678,845 B2
(45) Date of Patent: Jun. 9, 2020

(54) JUXTAPOSING CONTEXTUALLY SIMILAR CROSS-GENERATION IMAGES

(71) Applicant: INTERNATIONAL BUSINESS MACHINES CORPORATION, Armonk, NY (US)

(72) Inventors: Inseok Hwang, Austin, TX (US); Su Liu, Austin, TX (US); Eric Rozner, Austin, TX (US); Chungkuk Yoo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 15/942,635

(22) Filed: Apr. 2, 2018

(65) Prior Publication Data

US 2019/0303458 A1     Oct. 3, 2019

(51) Int. Cl.
*G06F 16/54*     (2019.01)
*G06F 3/16*     (2006.01)
(Continued)

(52) U.S. Cl.
CPC .............. *G06F 16/54* (2019.01); *G06F 3/167* (2013.01); *G06F 16/24578* (2019.01);
(Continued)

(58) Field of Classification Search
CPC .............. G06F 16/54; G06F 16/24578; G06F 16/5854; G06F 16/532; G06F 16/51; G06F 3/167; G06K 9/00288; G06K 9/00
See application file for complete search history.

(56) References Cited

U.S. PATENT DOCUMENTS 5,802,361 A * 9/1998 Wang .................. G06F 16/7335
382/217
6,035,055 A * 3/2000 Wang .................. G06F 16/5838
382/118
(Continued)

FOREIGN PATENT DOCUMENTS

WO     2009099435 A1     8/2009

OTHER PUBLICATIONS

Anonymous, "System and Method for Cognitive Shaping via Visual Analysis." IP.com Disclosure No. IPCOM000244312D, Publication Date: Dec. 1, 2015.
(Continued)

*Primary Examiner* — Xuemei G Chen
(74) *Attorney, Agent, or Firm* — ZIP Group PLLC

(57) ABSTRACT

A contemporary image is stored, is analyzed, and an associated data structure is generated. An image data structure may include image meta data, image classification data, image segment data, image caption data, or the like. The storage of the contemporary image is used as a triggering event and its data structure is used as an input to determine contextually relevant ancestral images. The contemporary image data structure is compared to respective data structures of ancestral images. A series of ancestral images are ranked based upon contextual similarly of their data structures to the contemporary image data structure. The most similar ancestral image is simultaneously displayed with the contemporary image. Interactions may be monitored, a prompt may be provided, a next ranked ancestral image may be displayed in place of the previous ancestral image, and/or a prompt to store a new contemporary image may be provided.

20 Claims, 7 Drawing Sheets

(51) Int. Cl.
*G06K 9/00* (2006.01)
*G06F 16/51* (2019.01)
*G06F 16/532* (2019.01)
*G06F 16/583* (2019.01)
*G06F 16/2457* (2019.01)

(52) U.S. Cl.
CPC ............ *G06F 16/51* (2019.01); *G06F 16/532* (2019.01); *G06F 16/5854* (2019.01); *G06K 9/00288* (2013.01)

(56) References Cited

U.S. PATENT DOCUMENTS

| | | | |
|---|---|---|---|
| 6,102,846 | A | 8/2000 | Patton et al. |
| 6,504,571 | B1* | 1/2003 | Narayanaswami ........................ H04N 1/32101 348/231.99 |
| 7,872,669 | B2* | 1/2011 | Darrell ................. G06F 16/951 348/207.1 |
| 7,903,904 | B1* | 3/2011 | Loeb ................. G06K 9/00677 382/305 |
| 8,392,430 | B2* | 3/2013 | Hua ................. G06F 16/24578 707/748 |
| 9,031,960 | B1* | 5/2015 | Wang ................. G06F 16/5838 707/749 |
| 9,070,088 | B1* | 6/2015 | Baveja ............. G06F 16/24578 |
| 9,794,213 | B1* | 10/2017 | Greenberger ........ G06K 9/6215 |
| 10,298,690 | B2* | 5/2019 | Liu ......................... H04L 67/06 |
| 10,321,051 | B2* | 6/2019 | Balasubramanian ........................ H04N 5/23222 |
| 2005/0228785 | A1 | 10/2005 | Wolcott et al. |
| 2006/0092487 | A1 | 5/2006 | Kuwabara et al. |
| 2007/0103561 | A1* | 5/2007 | Kunieda ................ G11B 27/10 348/220.1 |
| 2008/0215548 | A1* | 9/2008 | Ohashi ................ G06F 16/5838 |
| 2009/0312668 | A1 | 12/2009 | Leuthardt et al. |
| 2010/0080470 | A1* | 4/2010 | Deluca ............. G06K 9/00664 382/209 |
| 2010/0332571 | A1* | 12/2010 | Healey ................ G06F 19/3475 707/759 |
| 2011/0188713 | A1* | 8/2011 | Chin ..................... G06F 16/583 382/118 |
| 2012/0213445 | A1* | 8/2012 | Luu ......................... G06F 16/58 382/218 |
| 2013/0150660 | A1 | 6/2013 | Pompilio et al. |
| 2013/0339020 | A1* | 12/2013 | Heo .................. H04N 5/44513 704/254 |
| 2014/0040365 | A1* | 2/2014 | Carter .................... H04L 67/22 709/204 |
| 2014/0250109 | A1* | 9/2014 | Wang .................. G06F 16/5838 707/723 |
| 2015/0149200 | A1 | 5/2015 | Kerssens et al. |
| 2016/0042140 | A1 | 2/2016 | Reinders et al. |
| 2016/0136384 | A1 | 5/2016 | Cover |
| 2016/0196350 | A1* | 7/2016 | Mau ..................... G06K 9/6263 707/706 |
| 2016/0217157 | A1* | 7/2016 | Shih ..................... G06F 16/5838 |
| 2017/0085547 | A1* | 3/2017 | De Aguiar .......... G06F 16/2255 |
| 2018/0144479 | A1* | 5/2018 | Nakasu ............... G06K 9/00771 |
| 2018/0218049 | A1* | 8/2018 | Bostick ................. H04L 67/306 |
| 2018/0329946 | A1* | 11/2018 | Gbur ................ G06K 19/06037 |
| 2019/0050208 | A1* | 2/2019 | Pandey ..................... G06F 8/42 |

OTHER PUBLICATIONS

Zhou, "A Study of Photographs as Communication Content for Intergenerational Conversation Support System," V.G. Duffy (Ed.): DHM 2017, Part II, LNCS 10287.

M. Iwamoto, "Consideration of Appropriate Photo Image to the Conversation of the Elderly and Youth by Using Facial Expression Analysis." In W. Chung and C.S. Shin (eds.), Advances in Affective and Pleasurable Design, Advances in Intelligent Systems and Computing 483.

N. Kuwahara, "Networked Reminiscence Therapy for Individuals with Dementia by using Photo and Video Sharing." Assets'06, Oct. 22-25, 2006, Portland, Oregon, USA.

K. Smith, "Multimedia Biographies: A Reminiscence and Social Stimulus Tool for Persons with Cognitive Impairment." Journal of Technology in Human Services, 2009.

M. Mulvenna. "Evaluation of card-based versus device-based reminiscing using photographic images." J. CyberTherapy & Rehabilitation, Spring 2011, vol. 4, No. 1.

V. Nguyen, "NowAndThen: a social network-based photo recommendation tool supporting reminiscence." In Proceedings of the 15th International Conference on Mobile and Ubiquitous Multimedia (MUM '16). ACM, New York, NY, USA, 2016.

A. Bermingham, "Automatically recommending multimedia content for use in group reminiscence therap." In Proceedings of the 1st ACM international workshop on Multimedia indexing and information retrieval for healthcare (MIIRH '13). ACM, New York, NY, USA, 2013.

G. Gowans, "Designing a multimedia conversation aid for reminiscence therapy in dementia care environments." In CHI '04 Extended Abstracts on Human Factors in Computing Systems (CHI EA '04). ACM, New York, NY, USA, 2004.

* cited by examiner

JUXTAPOSING CONTEXTUALLY SIMILAR CROSS-GENERATION IMAGES

FIELD OF THE INVENTION

Embodiments of the invention generally relate to computers and more particularly to a computing system simultaneously displays a contextually similar image with an input image, subsequent to the computer system determining a data structure associated with the contextually similar image includes data of the same context as a data structure associated with the input image.

DESCRIPTION OF THE RELATED ART

Engagement with elders to trigger his or her memories or to spur conversations are important to elder's mental and emotional health. Elder depression is linked to increased risk of suicide and is highly associated with lack of interaction and loneliness. Opportunities for elders to reminisce about their own life experience may be therapeutic. Further, promoting intergenerational conversation may be particularly therapeutic.

SUMMARY

In an embodiment of the present invention, a method of simultaneously displaying an ancestral image and a contemporary image is presented. The method includes
analyzing, with a first computer, a plurality of ancestral images stored within an ancestral dataspace local to first computer and generating a plurality of ancestral image data structures. One ancestral data structure is linked to one ancestral image and each of the ancestral image data structures include contextual data of one or more entities depicted within the linked ancestral image. The method further includes subsequently detecting, with the first computer, that a contemporary image has been stored within a contemporary image dataspace local to a second computer connected to the first computer by a network and resultantly retrieving the contemporary image from the contemporary image dataspace. The method further includes analyzing, with the first computer, the retrieved contemporary image to generate a linked contemporary image data structure comprising contextual data of one or more entities depicted within the retrieved contemporary image. The method further includes ranking, with the first computer, the plurality of ancestral images based upon degree of similarity between the ancestral image data structures and the contemporary image data structure. The method further includes identifying, with the first computer, an ancestral image linked to an ancestral image data structure with the highest degree of similarity to the contemporary image data structure and simultaneously displaying the contemporary image and the ancestral image upon a screen of the first computer. The method further includes generating, with the first computer, a description prompt comprising a description of one or more entities depicted within contemporary image from the contemporary image data structure, generating, with the first computer, an interaction prompt comprising a query about one or more entities depicted within the ancestral image from the ancestral image data structure, and providing, with the first computer, the description prompt and the interaction prompt.

In another embodiment of the present invention, a computer program product for simultaneously displaying an ancestral image and a contemporary image is provided. The computer program product includes a computer readable storage medium that has program instructions embodied therewith. The program instructions are readable by a first computing system to cause the first computing system to analyze a plurality of ancestral images stored within an ancestral dataspace local to the first computer and generate a plurality of ancestral image data structures. One ancestral data structure is linked to one ancestral image and each of the ancestral image data structures includes contextual data of one or more entities depicted within the linked ancestral image. The program instructions are readable by a first computing system to cause the first computing system to subsequently detect that a contemporary image has been stored within a contemporary image dataspace local to a second computer connected to the first computer by a network and resultantly retrieve the contemporary image from the contemporary image dataspace. The program instructions are readable by a first computing system to cause the first computing system to analyze the retrieved contemporary image and generate a linked contemporary image data structure that includes contextual data of one or more entities depicted within the retrieved contemporary image. The program instructions are readable by a first computing system to cause the first computing system to rank the plurality of ancestral images based upon degree of similarity between the ancestral image data structures and the contemporary image data structure. The program instructions are readable by a first computing system to cause the first computing system to identify an ancestral image linked to an ancestral image data structure with the highest degree of similarity to the contemporary image data structure and simultaneously display the contemporary image and the ancestral image upon a screen of the first computer. The program instructions are readable by a first computing system to cause the first computing system to generate a description prompt comprising a description of one or more entities depicted within contemporary image from the contemporary image data structure, generate an interaction prompt comprising a query about one or more entities depicted within the ancestral image from the ancestral image data structure, and provide the description prompt and the interaction prompt.

In yet another embodiment of the present invention, a computer that includes a processor and a memory is presented. The memory includes program instructions that are readable by the processor to cause the processor to analyze a plurality of ancestral images stored within an ancestral dataspace local to the first computer and generate a plurality of ancestral image data structures. One ancestral data structure is linked to one ancestral image and each of the ancestral image data structures includes contextual data of one or more entities depicted within the linked ancestral image. The memory includes program instructions that are readable by the processor to cause the processor to subsequently detect that a contemporary image has been stored within a contemporary image dataspace local to a second computer connected to the first computer by a network and resultantly retrieve the contemporary image from the contemporary image dataspace. The memory includes program instructions that are readable by the processor to cause the processor to analyze the retrieved contemporary image and generate a linked contemporary image data structure that includes contextual data of one or more entities depicted within the retrieved contemporary image. The memory includes program instructions that are readable by the processor to cause the processor to rank the plurality of ancestral images based upon degree of similarity between the ancestral image data structures and the contemporary image data structure. The memory includes program instructions that are readable by the processor to cause the processor to identify an ancestral image linked to an ancestral image data structure with the highest degree of similarity to the contemporary image data structure and simultaneously display the contemporary image and the ancestral image upon a screen of the first computer. The memory includes program instructions that are readable by the processor to cause the processor to generate a description prompt comprising a description of one or more entities depicted within contemporary image from the contemporary image data structure, generate an interaction prompt comprising a query about one or more entities depicted within the ancestral image from the ancestral image data structure, and provide the description prompt and the interaction prompt.

These and other embodiments, features, aspects, and advantages will become better understood with reference to the following description, appended claims, and accompanying drawings.

It is to be noted, however, that the appended drawings illustrate only example embodiments of the invention and are therefore not considered a limitation of the scope of embodiments of the invention.

DETAILED DESCRIPTION

A contemporary image is stored, is analyzed, and an associated data structure is generated. An image data structure may include image meta data, image classification data, image segment data, image caption data, or the like. The storage of the contemporary image is used as a triggering event and its data structure is used as an input to determine contextually relevant ancestral images. The contemporary image data structure is compared to respective data structures of ancestral images. The series of ancestral images are ranked based upon contextual similarly of their data structures to the contemporary image data structure. The most similar ancestral image is simultaneously displayed with the contemporary image. Interactions may be monitored and a prompt may be provided to spur interaction, a next ranked ancestral image may be displayed in place of the previous ancestral image, and/or a prompt to store a new contemporary image may be provided.

Figure 1:
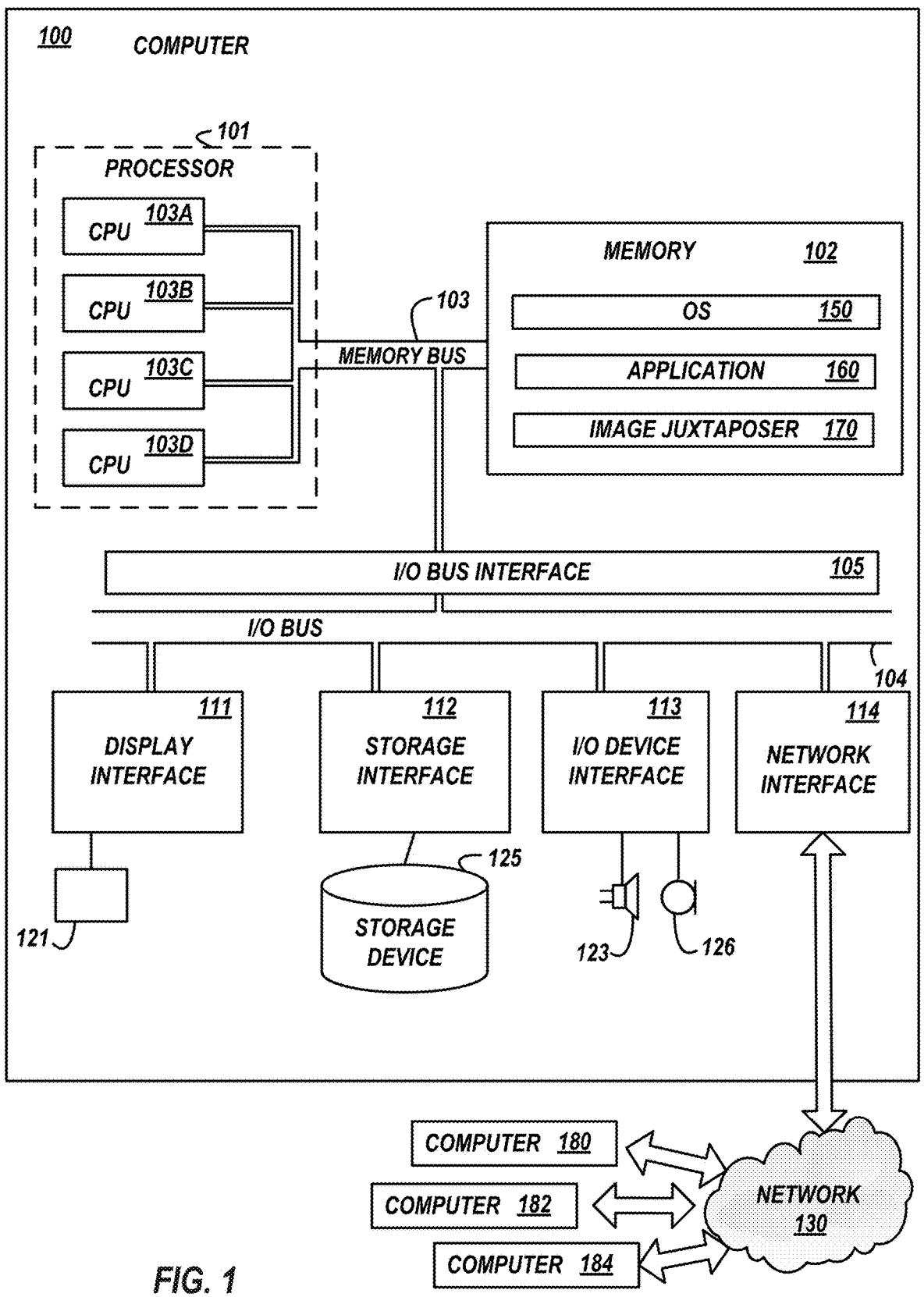
FIG. 1 illustrates a high-level block diagram of an exemplary computer for implementing various embodiments of the invention.

Referring to the Drawings, wherein like numbers denote like parts throughout the several views, FIG. 1 depicts a high-level block diagram representation of a computer 100. Computer 100 may be connected to other computers 180, 182, and or 184 via one or more networks 130. Computer 180, 182, and/or 184 may include the same components, fewer components, or additional components as computer 100. The term "computer" is used herein for convenience only, and in various embodiments is a more general data handling system, such as a mobile phone, tablet, server computer, wearable device, etc. The mechanisms and apparatus of embodiments of the present invention apply equally to any appropriate data handling system. In an embodiment, computer 100 is a client computer such as a mobile phone, tablet computer, personal computer, or the like.

The major components of the computer 100 may comprise one or more processor 101, system memory 102, display interface 111, storage interface 112, I/O (Input/Output) device interface 113, and/or network interface 114, all of which are communicatively coupled, directly or indirectly, for inter-component communication via one or more busses, such as memory bus 103, I/O bus 104, an I/O bus interface 105, etc.

The computer 100 contains one or more general-purpose programmable central processing units (CPUs) 103A, 103B, 103C, and 103D, herein generically referred to as processor 101. In embodiments, the computer 100 contains multiple processors 101 typical of a relatively large system such as a server computer. Each processor 101 executes instructions stored in the system memory 102 and may comprise one or more levels of on-board cache.

The system memory 102 may comprise a random-access semiconductor memory, storage device, or storage medium for storing or encoding data and programs. In another embodiment, the system memory 102 represents the entire virtual memory of the computer 100 and may also include the virtual memory of other computers 180, 182, 184 coupled to the computer 100 or connected via the network 130. The system memory 102 is conceptually a single monolithic entity, but in other embodiments the system memory 102 is a more complex arrangement, such as a hierarchy of caches and other memory devices. For example, memory 102 may exist in multiple levels of caches, and these caches may be further divided by function, so that one cache holds instructions while another holds non-instruction data, which is used by the processor 101. Memory may be further distributed and associated with different processors 101 or sets of processors 101, as is known in any of various so-called non-uniform memory access (NUMA) computer architectures.

The system memory 102 stores or encodes operating system 150 and one or more applications 160, such as image juxtaposer 170. Although the operating system 150, applications 160, etc. are illustrated as being contained within the memory 102 in the computer 100, in other embodiments all or the operating system 150, application 160 or a portion of the operating system 150, application 160 may be on a different computer 180, 182, and/or 184 and may be accessed remotely, e.g., via the network 130. The computer 100 may use virtual addressing mechanisms that allow the programs of the computer 100 to behave as if they only have access to a large, single storage entity instead of access to multiple, smaller storage entities. Thus, while operating system 150, applications 160, or other program instructions are illustrated as being contained within the system memory 102, these elements are not necessarily all completely contained in the same storage device at the same time. Further, although operating system 150, applications 160, other program instructions, etc. are illustrated as being separate entities, in other embodiments some of them, portions of some of them, or all of them may be packaged together, etc.

In an embodiment, operating system 150, application 160, and/or other program instructions comprise instructions or statements that execute on the one or more processors 101 and/or instructions or statements that are interpreted by instructions or statements that execute on the one or more processors 101 to carry out the functions as further described below. When such program instructions are able to be run by the one or more processors 101, such computer 100 or system or multiple computers 100, 180, 182, and/or 184 become a particular machine configured to carry out such instructions.

One or more processors 101 may function as a general-purpose programmable graphics processor unit (GPU) that builds a graphical interface (e.g. a GUI) for output to a display. The GPU, working in conjunction with one or more applications 160, such as image juxtaposer 170, manipulates pixels of a display, such as touch screen 121, to create a display user interface. Ultimately, the interface (e.g. GUI, etc.) is displayed to a user via the display, such as touch screen 124. The processor 101 and GPU may be discrete components or may be integrated into a single component. Similarly, one or more processors 101 may function as a voice processor unit (VPU) that builds a voice interface (e.g. a VUI) for output to a speaker 123 and/or input from a microphone 123. The VPU, working in conjunction with one or more applications 160, such as image juxtaposer 170 may receive audio waves by microphone 126 and may generate audio waves for output by speaker 123. The VPU may ingest the input audio waves, process the input audio waves into a computer readable data format, and may utilize such data to generate another audio wave that may be output by speaker 123. The processor 101, GPU, VPU, or the like may be discrete components or may be integrated into a single component.

The memory bus 103 provides a data communication path for transferring data among the processor 101, the system memory 102, and the I/O bus interface 105. The I/O bus interface 105 is further coupled to the system I/O bus 104 for transferring data to and from the various I/O interfaces. The I/O bus interface 105 communicates with multiple I/O interfaces 111, 112, 113, and 114, which may also be known as I/O processors (IOPs) or I/O adapters (IOAs), through the system I/O bus 104. The I/O interfaces support communication with a variety of storage and I/O devices local to the computer 100. For example, the display interface 111 supports the attachment of one or more integrated user I/O devices, such as a touch screen 121. Other output devices may be a video display device, speaker 123, or the like. Other input devices may be a keyboard, microphone 126, or the like.

A user may engage with the I/O devices using a user interface, in order to provide input data and commands to the computer 100 and may receive output data from the user interface. For example, one interface may be displayed in the GUI that is presented upon the touch screen 121 and another interface may be presented by output upon speaker 123. The user interface or interfaces may be a user interface that provides content to a user visually (e.g. via a screen 121), audibly (e.g. via a speaker 123), and/or via touch (e.g. vibrations, etc.) via a haptic device. In some embodiments, the computer 100 itself acts as the user interface as the user may move the computer 100 in ways to interact with, input, or manipulate computer application 160 data, function, etc.

The storage interface 112 supports the attachment of one or more disk drives or one or more storage devices 125. In an embodiment, the storage devices 125 are disk drive storage device(s), solid state storage device(s), or the like. In embodiments the multiple devices are configured to appear as a single large storage device. The contents of the system memory 102, or any portion thereof, may be stored to and retrieved from the storage devices 125, as needed. The storage devices 125 generally have a slower access time than does the memory 102, meaning that the time needed to read and/or write data from/to the memory 102 is less than the time needed to read and/or write data from/to for the storage devices 125.

The I/O device interface 113 provides an interface to any of various other external input/output devices that are external to computer 100, such as a haptic device, speaker 123, microphone 126, or the like. The network interface 114 provides one or more communications paths from the computer 100 to other data handling devices such as numerous other computers (e.g., computer 180, 182, 184); such paths may be comprised within, e.g., one or more networks 130.

Although the memory bus 103 is shown in FIG. 1 as a relatively simple, single bus structure providing a direct communication path among the processors 101, the system memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective entities, the computer 100 may, in fact, contain multiple I/O bus interfaces 105 and/or multiple I/O buses 104. While multiple I/O interfaces are shown, which separate the system I/O bus 104 from various communications paths running to the various I/O devices, in other embodiments some or all of the I/O devices are connected directly to one or more system I/O buses.

Network interface 114 may contain electronic components and logic to adapt or convert data of one protocol on I/O bus 104 to another protocol. Therefore, network interface 114 may connect a wide variety of devices to computer 100 and to each other such as, but not limited to, servers, computers, bus adapters, PCI adapters, PCIe adapters, NVLink adapters, or computer 180 using one or more protocols including, but not limited to, Token Ring, Gigabit Ethernet, Ethernet, Fibre Channel, SSA, Fibre Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics connections, etc.

Though shown as distinct entities, the multiple I/O interfaces 111, 112, 113, and 114 or the functionality of the I/O interfaces 111, 112, 113, and 114 may be integrated into the same logical or physical entity.

In various embodiments, the computer 180, 182, 184 are multi-user mainframe computers, single-user systems, server computers, or similar devices that has little or no direct user interface, but receives requests from other computers, such as computer 100. In such embodiments, the computer 100 may be implemented as a desktop computer, portable computer, laptop or notebook computer, tablet computer, pocket computer, telephone, smart phone, automobile infotainment console, teleconferencing system, appliance, or any other appropriate type of electronic device. In other embodiments, the computer 100 and computers 180, 182, 184 may be the same type of computer. The computers 100, 180, 182, 184 may be controlled or managed by the same or different entities. For example, computer 100 may be controlled by a user and computer 180 may be controlled by a web service provider.

The network 130 may be any suitable network or combination of networks and may support any appropriate protocol suitable for communication of data and/or code to/from the computer 100 and at least the computer 180. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100. The individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer 100 according to various embodiments of the invention may be implemented in a number of manners, including using various computer applications, routines, components, programs, objects, modules, data structures, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

Figure 2:
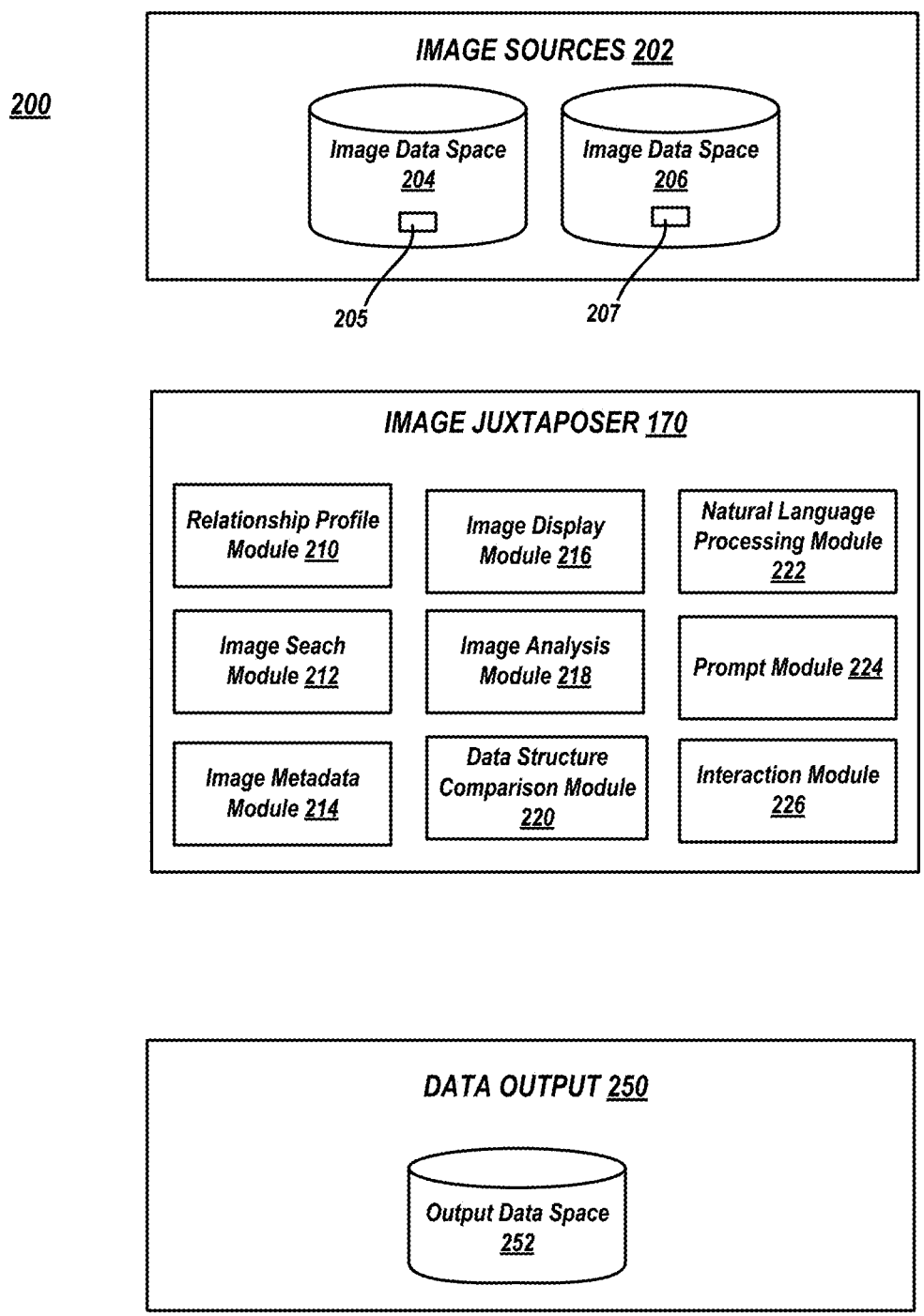
FIG. 2 illustrates a high-level block diagram of an image juxtaposer system that may implement various embodiments of the invention.

FIG. 2 illustrates a high-level block diagram of an image juxtaposer system 200 that may implement various embodiments of the invention. Juxtaposer system 200 includes image juxtaposer 170, image sources 202, and data output 250.

Image sources 202 include an ancestral storage space 204 that stores ancestral images. The term "ancestral image," or the like is defined herein to be a photograph image that is targeted to elicit an emotive or reminiscent response upon its viewing by the elder. Ancestral storage space 204 may be located within one or more storage devices 125 within computer 100, may be located within one or more storage devices 125 within computer 180, or the like. If ancestral storage space 204 is local to computer 180, data space 204 may further include image retriever 205 that moves ancestral images to computer 100. Image retriever 205 may be an application within memory 120 of another computer than computer 100, such as computer 180, or the like. In other words, image retriever 205 may be a local portion of juxtaposer 170 within a different computer relative to juxtaposer 170.

Image sources 202 also includes a contemporary storage space 206 that stores contemporary images. The term "contemporary image," or the like is defined herein to be a photograph image captured after any ancestral images. Contemporary storage space 206 may be located within one or more storage devices 125 within computer 100, or in a preferred embodiment is be located within one or more storage devices 125 within computer 180, or the like. If contemporary storage space 206 is local to computer 180, data space 206 may further include image retriever 207 that moves ancestral images automatically to computer 100 upon the ancestral images being saved to the contemporary storage space 206. Image retriever 207 may be an application within memory 120 of another computer than computer 100, such as computer 180, or the like. In other words, image retriever 207 may be a local portion of juxtaposer 170 within a different computer relative to juxtaposer 170.

Image juxtaposer 170 is an application that includes program instructions stored in memory 120 that when evoked by processor 101 causes computer 100 to perform the functionality described herein. Image juxtaposer 170 may include a relationship profile module 210, image search module 212, image meta data module 214, image display module 216, image analysis module 218, data structure comparison module 220, natural language processing module 222, prompt module 224, and/or interaction module 226.

Image analysis module 218 analyses each ancestral image stored with storage space 204 and generates a data structure associated with each ancestral image. These data structures are stored in output storage space 252. Output storage space 252 may be located within one or more storage devices 125 within computer 100, may be located within one or more storage devices 125 within computer 180, or the like. Image analysis module 218 may utilize relationship profile module 210 to determine the relationship of person or persons depicted within ancestral images to the elder.

Upon a new contemporary image being stored within contemporary storage space 206, image analysis module 218 analyzes the new contemporary image and generates an associated data structure. Image analysis module 218 may utilize relationship profile module 210 to determine the relationship of the person or persons depicted in contemporary images to the elder. Image analysis module 218 may utilize image search module 212 to search the web to extract meta data that is not local to the digital file of the contemporary image. Image analysis module 218 may utilize image metadata module 214 to extract metadata local to the digital image file of the contemporary image.

The storage of the contemporary image in storage space 206 is used as a triggering event and its data structure is used as an input of data structure comparison module 220 to determine contextually relevant ancestral images within storage space 204. The contemporary image data structure may be stored within output storage space 252 and is compared to respective data structures of ancestral images. Data structure comparison module 220 ranks the ancestral images based upon the contextual similarity of their data structures to the contemporary image data structure. The most similar ancestral image is simultaneously displayed by image display module 216 with the contemporary image. Interactions may be monitored by interaction module 226. Interaction module 226 may instruct prompt module 224 to output a prompt to spur interaction, may instruct image display module 216 to display a next ranked ancestral image in place of the previous ancestral image, and/or may instruct prompt module 224 to output a prompt to store a new contemporary image. The one or more prompts may be generated from the contemporary image data structure and/or the ancestral data structure that are simultaneously displayed by natural language processing module 222.

Figure 3:
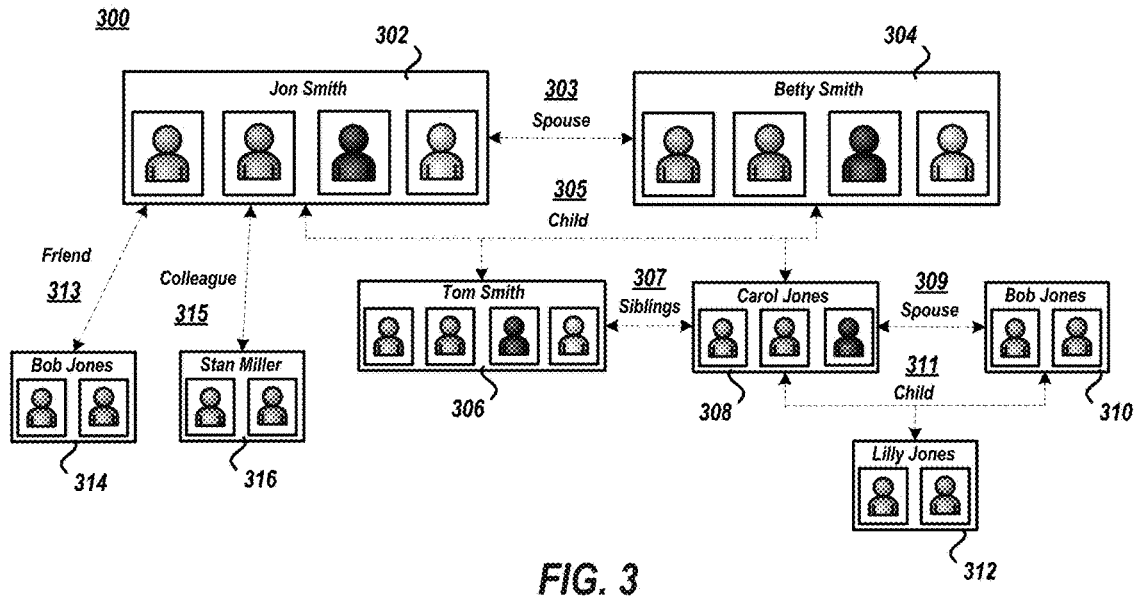
FIG. 3 illustrates an exemplary relationship profile data structure, according to one or more embodiments of the present invention.

FIG. 3 illustrates an exemplary relationship profile data structure 300. Relationship profile data structure 300 may be generated by relationship profile module 210 and may be located within output data space 252. Data structure 300 includes primary user entry 302 that includes a name or identifier of the primary user and one or more images that depict the face of the primary user. Relationship profile data structure 300 may also include a zero-degree entry 304 that includes a name or identifier of a zero-degree person related to primary user and one or more images that depict the face of zero-degree person. A relationship 303 may define the relationship between the primary user and the zero-degree person. Though one zero-degree entry 304 is depicted within data structure 300, there may be multiple zero-degree entries.

Relationship profile data structure 300 may also include one or more first-degree entries, such as first-degree entry 306 and first-degree entry 308, that respectively includes a name or identifier of a first-degree person related to primary user and one or more images that depict the face of first-degree person. A relationship may define the relationship between the primary user and the first-degree person. For example, a relationship 305 may define the relationship between the primary user and the first-degree person of entry 306 and may define the relationship between the primary user and the first-degree person of entry 308. A relationship may define the relationship between the persons in the same relationship degree to the primary user. For example, a relationship 307 may define the relationship between the first-degree person of entry 306 and the first-degree person of entry 308. Relationship profile data structure 300 may also include one or more in law entries, such as in law entry 310, that includes a name or identifier of an in-law person related to primary user and one or more images that depict the face of in-law person. A relationship may define the relationship between the in-law person to the primary user or to a degree person. For example, a relationship 309 may define the relationship between the first-degree person of entry 308 and in-law person of entry 310.

Relationship profile data structure 300 may also include one or more second-degree entries, such as second-degree entry 312, that includes a name or identifier of a second-degree person related to primary user and one or more images that depict the face of second-degree person. A relationship may define the relationship between the first-degree person or the primary user and the second-degree person. For example, a relationship 311 may define the relationship between the first-degree person of entry 308 and the second-degree person of entry 312. Various multiple relationships may be reconciled to determine or indicate the relationship relative to the primary user. For example, relationship 305 and 311 may be reconciled to determine or indicate the relationship between the person of entry 312 and the primary user 302.

Relationship profile data structure 300 may also include one or more miscellaneous entries, such as miscellaneous entry 314 and miscellaneous entry 316, that includes a name or identifier of a miscellaneous person associated with the primary user and one or more images that depict the face of miscellaneous person. A relationship may define the relationship between the miscellaneous person or the primary user. For example, a relationship 313 may define the relationship between the miscellaneous person of entry 314 and the primary user and a relationship 315 may define the relationship between the miscellaneous person of entry 316 and the primary user.

Though shown as a tree data structure, relationship profile data structure 300 may be structured in other formats such as a table, database, or the like.

Figure 4:
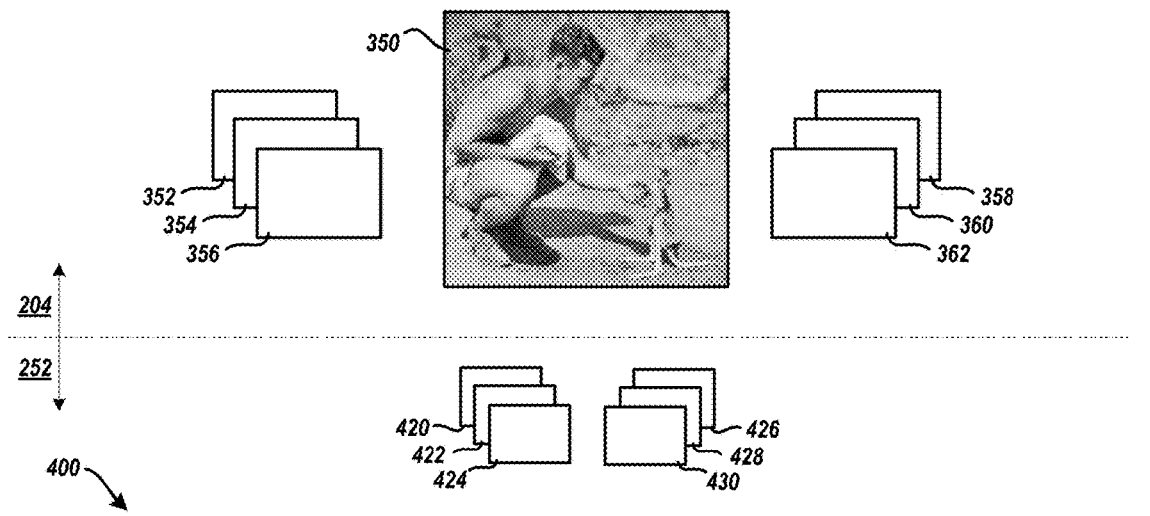
FIG. 4 illustrates an exemplary ancestral image and an associated image data structure, according to one or more embodiments of the present invention.

FIG. 4 illustrates an ancestral image 350 and an associated image data structure 400. For clarity, though entity details of only ancestral image 350 are depicted, other ancestral images 352, 354, 356, 358, 360, and 362 also include respective entity detail (not shown). Ancestral images 350, 352, 354, 356, 358, 360, and 362 are photograph images that are targeted to elicit an emotive or reminiscent response upon its viewing by the primary user. For example, ancestral image 350 is a photograph that depicts the primary user.

Image analysis module 218 analysis ancestral image 350 and generates image data structure 400 from such analysis. Image analysis module 218 may utilize image classification schemes, image segmentation schemes, image captioning schemes, facial recognition schemes, or the like to determine contextual data of the image. Such contextual data is organized within the data structure associated with the analyzed image.

Image classification determines one or more text labels that describe entities that are depicted within the image. Such labels may relate to the scene of the image, the sentiment of a person or person depicted within the image, the type of entity depicted in the image, text depicted within the image, logos depicted within the image, or the like. Image segmentation determines entities within the image by grouping like image pixels. Image captioning determines a text description of the entities depicted within the image. Facial recognition determines the identify of a person or persons depicted within the image. Image analysis module 218 may also integrate contextual data that is extracted from the image by metadata module 214 and/or is found by image search module 212 into the associated image data structure.

Image data structure 400 may include an image identifier entry 402, one or more local metadata entries 404, one or more image scene entries 406, one or more image sentiment entries 408, one or more image caption entries 410, one or more facial analysis entries 412, and/or one or more external metadata entries 414. Image identifier entry 402 contains data that associates the data structure 400 with the analyzed contemporary image 350.

Local metadata entries 402 are exemplary contextual data, for example image metadata that local to the image file. Metadata that may be local to the image file may be a geotag, location, date, time, or the like of when the image was captured.

Image scene entries 406 and image sentiment entries 408 are exemplary contextual data, for example, labels determined by analysis module's 218 image classification schemes and an associated confidence indication of how accurate the label describes the image.

For example, as depicted, scene entries 406 may include a linked data pair of a tag "man" and an associated confidence indication of "96%" that indicates how accurate image analysis module 218 is that the label "man" describes an entity depicted within image 350, may include a linked data pair of a tag "kangaroo" and an associated confidence indication of "93%" that indicates how accurate image analysis module 218 is that the label "kangaroo" describes an entity depicted within image 350, may include a linked data pair of a tag "sand" and an associated confidence indication of "88%" that indicates how accurate image analysis module 218 is that the label "sand" describes an entity depicted within image 350, may include a linked data pair of a tag "animal" and an associated confidence indication of "87%" that indicates how accurate image analysis module 218 is that the label "animal" describes an entity depicted within image 350, may include a linked data pair of a tag "leg" and an associated confidence indication of "86%" that indicates how accurate image analysis module 218 is that the label "leg" describes an entity depicted within image 350, may include a linked data pair of a tag "muscle" and an associated confidence indication of "85%" that indicates how accurate image analysis module 218 is that the label "muscle" describes an entity depicted within image 350, may include a linked data pair of a tag "summer" and an associated confidence indication of "84%" that indicates how accurate image analysis module 218 is that the label "summer" describes an entity depicted within image 350, may include a linked data pair of a tag "vacation" and an associated confidence indication of "82%" that indicates how accurate image analysis module 218 is that the label "vacation" describes an entity depicted within image 350, and may include a linked data pair of a tag "Australia" and an associated confidence indication of "65%" that indicates how accurate image analysis module 218 is that the label "Australia" describes an entity depicted within image 350.

Similarly, as depicted, sentiment entries 408 may include a linked data pair of a tag "happy" and an associated confidence indication of "80%" that indicates how accurate image analysis module 218 is that the label "happy" describes an entity depicted within image 350 and may include a linked data pair of a tag "fun" and an associated confidence indication of "75%" that indicates how accurate image analysis module 218 is that the label "fun" describes an entity depicted within image 350.

Image caption entries 410 are exemplary contextual data, for example, text descriptions of the entities depicted within the image determined by analysis module's 218 image captioning schemes and an associated confidence indication of how accurate the text description describes the ancestral image. For example, as depicted, image caption entry 410 may include a linked data pair of a text description "A man petting a kangaroo" and an associated confidence indication of "90%" that indicates how accurate image analysis module 218 is that the text description "A man petting a kangaroo" describes an entity or entities depicted within image 350.

Facial analysis entries 412 are exemplary contextual data, for example, the identity of a person or persons depicted in the image and an associated confidence indication of how accurate the comparison of the face within the ancestral image was to one or more faces within the relationship profile data structure 300. For example, as depicted, image caption entry 410 may include a linked data pair of the identity "Jon Smith" as the person depicted in image 350 and an associated confidence indication of "98%" that indicates how image analysis module 218 identical the comparison of the face of the person depicted in image 350 is to a face depicted within an image within relationship profile data structure 300. If image analysis module 218 determines that the comparison of the face of the person depicted in image 350 with a face depicted within an ancestral image within relationship profile data structure 300 is identical above a certainty threshold (e.g., 90%, or the like) the person associated with the entry that which contains the facial image within the data structure 300 is determined as the person depicted in the ancestral image.

External metadata entries 414 are exemplary contextual data, for example image metadata that is external to the ancestral image file. External metadata may be determined by image search module 212 by searching images hosted upon computers (e.g. computer 182, 184, or the like) that do not include ancestral data space 204, finding an identical image to the ancestral image, and harvest data associated with the identical image from that computer. For example, as depicted, external metadata entries 414 may contain an linked data structure that indicates an address of the identical image found that is hosted at an address, "www.socialnetwork.example," of the other computer, a user "Tom Smith," that made a comment, "My Dad surprised my Mom in 1965 with a trip to Australia" associated with the identical image. External metadata entries 414 may also contain a linked data structure that indicates an address of the identical image found that is hosted at an address, "www.socialnetwork.example," of the other computer, a user "Jane Doe," that made a comment, "Your parents were so adventurous" associated with the identical image.

Analysis module 218 may similarly analyze ancestral image 352 and generate a data structure 420 associated therewith that contains entries of contextual data associated ancestral image 352. Likewise, analysis module 218 may similarly analyze ancestral image 354 and generate a data structure 422 associated therewith that contains entries of contextual data associated ancestral image 354, analysis module 218 may similarly analyze ancestral image 356 and generate a data structure 424 associated therewith that contains entries of contextual data associated ancestral image 356, analysis module 218 may similarly analyze ancestral image 358 and generate a data structure 426 associated therewith that contains entries of contextual data associated ancestral image 358, analysis module 218 may similarly analyze ancestral image 360 and generate a data structure 428 associated therewith that contains entries of contextual data associated ancestral image 360, and analysis module 218 may similarly analyze ancestral image 362 and generate a data structure 430 associated therewith that contains entries of contextual data associated ancestral image 362.

Figure 5:
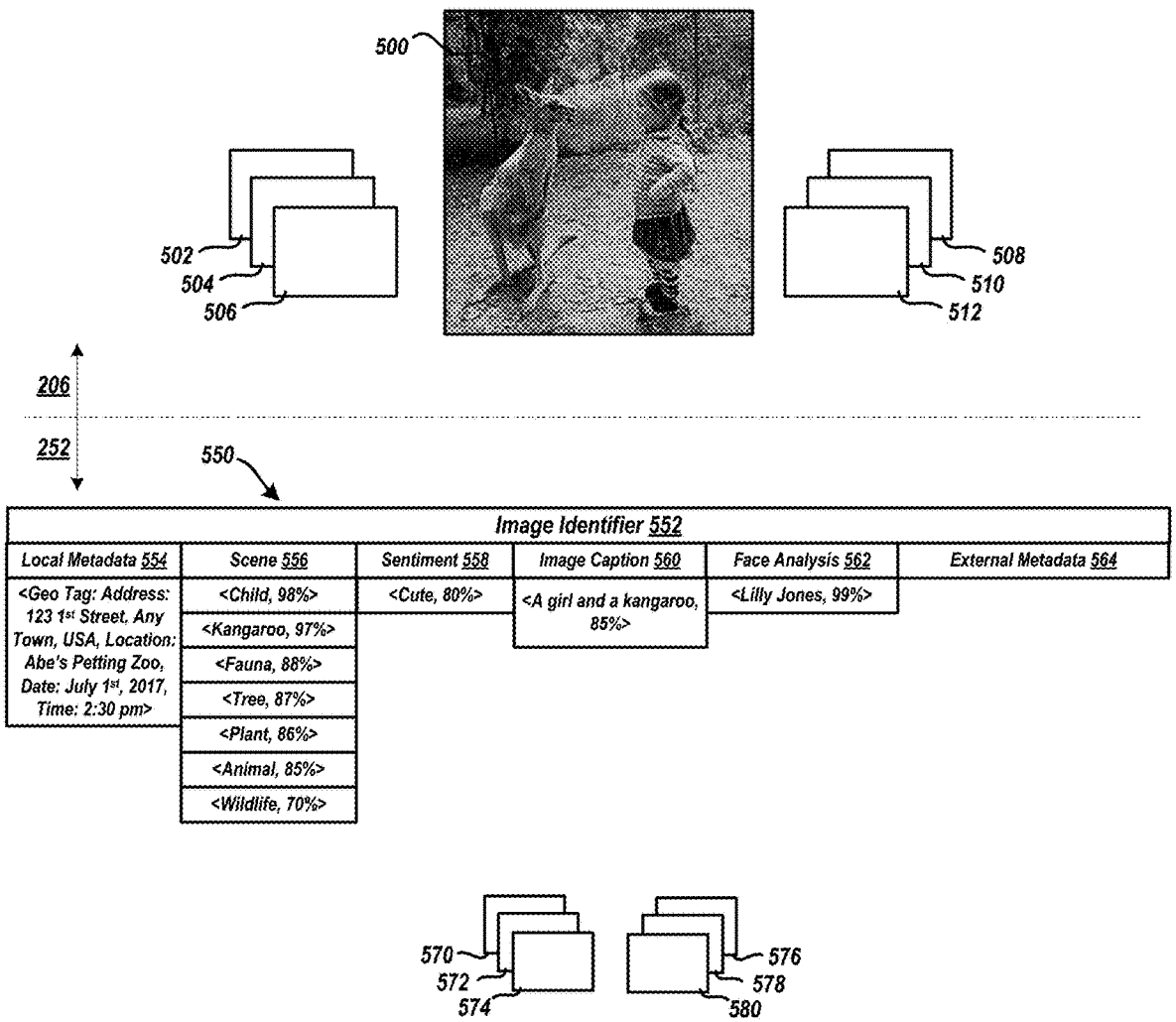
FIG. 5 illustrates an exemplary contemporary image and an associated image data structure, according to one or more embodiments of the present invention.

FIG. 5 illustrates contemporary image 500 and an associated image data structure 550. For clarity, though entity details of only contemporary image 500 are depicted, other contemporary images 502, 504, 506, 508, 510, and 512 also include respective entity detail (not shown). Contemporary images 500, 502, 504, 506, 508, 510, and 512 are photograph images that are captured after any ancestral images 350, 352, 354, 356, 358, 360, and 362. The number of contemporary images within data space 206 may be larger than the number of ancestral images within data space 204. Similarly, new contemporary images saved to data space 206 may occur more frequently than new ancestral images saved to data space 204. Likewise, contemporary images saved within data space 206 may depict a greater contextual diversity that the ancestral images within data space 204. As such, a new contemporary image being saved to data space 206 is used as a triggering event to determine contextually relevant ancestral images.

Image analysis module 218 analyzes contemporary image 500 and generates image data structure 550 from such analysis. Image data structure 550 may include an image identifier entry 552, one or more local metadata entries 554, one or more image scene entries 556, one or more image sentiment entries 558, one or more image caption entries 560, one or more facial analysis entries 562, and/or one or more external metadata entries 564. Image identifier entry 552 contains data that associates the data structure 550 with the analyzed contemporary image 550.

Local metadata entries 554 are exemplary contextual data, for example image metadata that local to the image file. For example, as depicted, local metadata entries 554 may include a linked data structure of a geotag location, an address of "123 1$^{st}$ Street, Any Town, USA," a location name, "Abe's Petting Zoo," an image capture date, "Jul. 1, 2017", and an image capture time, "2:20 pm."

Image scene entries 556 and image sentiment entries 558 are exemplary contextual data, for example, labels determined by analysis module's 218 image classification schemes and an associated confidence indication of how accurate the label describes the image.

For example, as depicted, scene entries 556 may include a linked data pair of a tag "child" and an associated confidence indication of "98%" that indicates how accurate image analysis module 218 is that the label "child" describes an entity depicted within image 500, may include a linked data pair of a tag "kangaroo" and an associated confidence indication of "97%" that indicates how accurate image analysis module 218 is that the label "kangaroo" describes an entity depicted within image 500, may include a linked data pair of a tag "fauna" and an associated confidence indication of "88%" that indicates how accurate image analysis module 218 is that the label "fauna" describes an entity depicted within image 500, may include a linked data pair of a tag "tree" and an associated confidence indication of "87%" that indicates how accurate image analysis module 218 is that the label "tree" describes an entity depicted within image 500, may include a linked data pair of a tag "plant" and an associated confidence indication of "86%" that indicates how accurate image analysis module 218 is that the label "plant" describes an entity depicted within image 500, may include a linked data pair of a tag "animal" and an associated confidence indication of "85%" that indicates how accurate image analysis module 218 is that the label "animal" describes an entity depicted within image 500, and may include a linked data pair of a tag "wildlife" and an associated confidence indication of "70%" that indicates how accurate image analysis module 218 is that the label "wildlife" describes an entity depicted within image 500.

Similarly, as depicted, sentiment entries 558 may include a linked data pair of a tag "cute" and an associated confidence indication of "80%" that indicates how accurate image analysis module 218 is that the label "cute" describes an entity depicted within image 500.

Image caption entries 560 are exemplary contextual data, for example, text descriptions of the entities depicted within the image determined by analysis module's 218 image captioning schemes and an associated confidence indication of how accurate the text description describes the contemporary image. For example, as depicted, image caption entry 560 may include a linked data pair of a text description "A girl and a kangaroo" and an associated confidence indication of "85%" that indicates how accurate image analysis module 218 is that the text description "A girl and a kangaroo" describes an entity or entities depicted within image 500.

Facial analysis entries 562 are exemplary contextual data, for example, the identity of a person or persons depicted in the image and an associated confidence indication of how accurate the comparison of the face within the contemporary image was to one or more faces within the relationship profile data structure 300. For example, as depicted, image caption entry 562 may include a linked data pair of the identity "Lilly Jones" as the person depicted in image 500 and an associated confidence indication of "99%" that indicates how image analysis module 218 identical the comparison of the face of the person depicted in image 500 is to a face depicted within an image within relationship profile data structure 300. If image analysis module 218 determines that the comparison of the face of the person depicted in a contemporary image with a face depicted within an image within relationship profile data structure 300 is identical above a certainty threshold (e.g., 90%, or the like) the person associated with the entry that which contains the facial image within the data structure 300 is determined as the person depicted in the contemporary image.

External metadata entries 564 are exemplary contextual data, for example image metadata that is external to the contemporary image file. External metadata may be determined by image search module 212 by searching images hosted upon computers (e.g. computer 182, 184, or the like) that do not include ancestral data space 204, finding an identical image to the contemporary image, and harvest data associated with the identical image from that computer.

Analysis module 218 may similarly analyze contemporary image 502 and generate a data structure 570 associated therewith that contains entries of contextual data associated contemporary image 502. Likewise, analysis module 218 may similarly analyze contemporary image 504 and generate a data structure 572 associated therewith that contains entries of contextual data associated contemporary image 504, analysis module 218 may similarly analyze contemporary image 506 and generate a data structure 574 associated therewith that contains entries of contextual data associated contemporary image 506, analysis module 218 may similarly analyze contemporary image 508 and generate a data structure 576 associated therewith that contains entries of contextual data associated contemporary image 508, analysis module 218 may similarly analyze contemporary image 510 and generate a data structure 578 associated therewith that contains entries of contextual data associated contemporary image 510, and analysis module 218 may similarly analyze contemporary image 512 and generate a data structure 580 associated therewith that contains entries of contextual data associated contemporary image 512.

Figure 6:
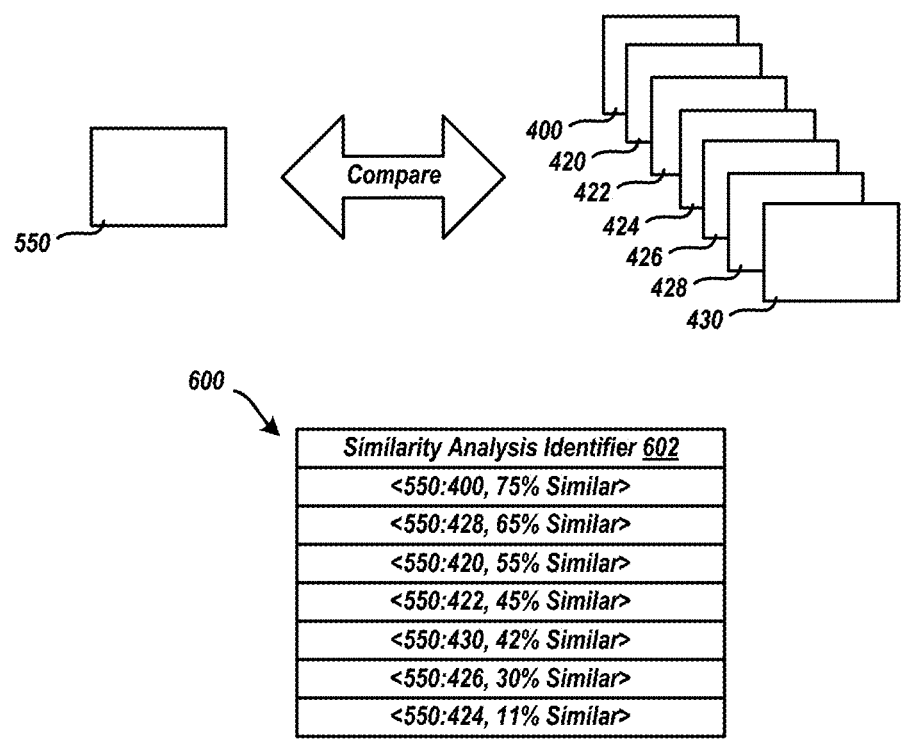
FIG. 6 illustrates a comparison data structure that ranks ancestral images to an input contemporary image based upon contextual similarly, according to one or more embodiments of the present invention.

FIG. 6 illustrates a comparison data structure 600 that ranks ancestral images to an input contemporary image based upon contextual similarly. Upon the contemporary image 500 being saved to dataspace 206, data structure comparison module 220 compares the contemporary image data structure 550 associated with the contemporary image 500 to each of the ancestral image data structures 400, 420, 422, 424, 426, 428, 430 respectively associated with each individual ancestral image within dataspace 204.

Data structure comparison module 220 may utilize natural language processing module 222 in comparing an input contemporary image data structure to each of the ancestral image data structures. Natural language processing module 222 may receive the contemporary image data structure and each of the ancestral image data structures and may analyze the received data structures (e.g., part of speech analysis, syntactic analysis, semantic analysis, etc.). The natural language processing module 222 may be configured to recognize and analyze any number of natural languages. In some embodiments, the natural language processing module 222 may parse contextual data of the contemporary image data structure to each of the ancestral image data structures.

Natural language processing module 222 may include a tokenizer, a part-of-speech (POS) tagger, a semantic relationship identifier, and a syntactic relationship identifier. In some embodiments, the tokenizer may be a computer module that performs lexical analysis. The tokenizer may convert a sequence of characters into a sequence of tokens. A token may be a string of characters included in contemporary image data structure to each of the ancestral image data structures and categorizes those characters as a meaningful symbol. Further, in some embodiments, the tokenizer may identify word or numerical boundaries and break any text or numerical passages into their component text or numerical elements, such as words, multiword tokens, numbers, punctuation marks, or the like. In some embodiments, the tokenizer may receive a string of characters, identify the lexemes in the string, and categorize them into tokens.

POS tagger may be a computer module that marks up a word in passages in contemporary image data structure to each of the ancestral image data structures to correspond to a particular part of speech. The POS tagger may read a passage or other text in natural language and assign a part of speech to each word or other token. The POS tagger may determine the part of speech to which a word (or other text element) corresponds based on the definition of the word. The definition of the word may be based on its relationship with adjacent and related words in a phrase, sentence, or paragraph. In some embodiments, the definition of a word may be dependent on one or more previously analyzed image data structures (e.g., the content of image data structure may shed light on the meaning of text elements in another image data structure). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by other components of the natural language processing module 222.

The semantic relationship identifier may be a module that is configured to identify semantic relationships of recognized text elements (e.g., words, phrases) in image data structures. In some embodiments, the semantic relationship identifier may determine functional dependencies between contextual data entries and other semantic relationships. The syntactic relationship identifier may be a computer module that is configured to identify syntactic relationships in image data structures. The syntactic relationship identifier may determine the grammatical structure of passages such as, for example, which groups of words are associated as phrases and which word is the subject or object of a verb. The syntactic relationship identifier may conform to formal grammar.

Data structure comparison module 220 may compare the contemporary image data structure to each of the ancestral data structures to determine the quantity of the same tags within the scene entries of the contemporary image data structure the scene entries of each of the ancestral data structures. Likewise, data structure comparison module 220 may compare the contemporary image data structure to each of the ancestral data structures to determine the quantity of the same tags within the sentiment entries of the contemporary image data structure to the sentiment entries of each of the ancestral data structures.

Data structure comparison module 220 may compare the contemporary image data structure to each of the ancestral data structures to determine if tags within the scene and/or sentiment entries of the contemporary image data structure have a genus species relationship to the tags within the scene and/or sentiment entries of each of the ancestral data structures. For example, data structure comparison module 220 may indicate that entry "kangaroo" is like entry "animal" due to the genus species relationship between kangaroo and animal.

Data structure comparison module 220 may compare the contemporary image data structure to each of the ancestral data structures to determine the degree of similarly between text descriptions within the image caption entries of the contemporary image data structure to the text descriptions within the image caption entries of the ancestral image data structure (e.g., whether the text descriptions have a part of speech, a syntactic, and/or a semantic similarly).

Data structure comparison module 220 may compare the contemporary image data structure to each of the ancestral data structures to determine the degree of relationship between the identity of person or persons as per the facial analysis entries within the contemporary image data structure to the identity of person or persons as per the facial analysis entries within the ancestral data structures (e.g., zero-degree person most similar, first-degree person next similar, second-degree person next similar, miscellaneous person next similar, or the like).

Data structure comparison module 220 subsequently generates a comparison data structure 600 that ranks the ancestral images to the input contemporary image 500 based upon the degree of similar between the contemporary image data structure 550 and the respective data structures 400, 420, 422, 424, 426, 428, and 430 of each of the ancestral images. Comparison data structure 600 may include similarly analysis entries 602 that may include linked data pairs that indicate the data structures there were compared and the degree of similarly between those data structures that were compared. Comparison data structure 600 may be stored in dataspace 252.

As depicted in FIG. 6, analysis entries 602 may include a linked data pair that indicates data structure 550 was compared to data structure 400 and that data structure 550 is 75% similar to data structure 400. Likewise, analysis entries 602 may further include a linked data pair that indicates data structure 550 was compared to data structure 420 and that data structure 550 is 65% similar to data structure 420. Likewise, analysis entries 602 may further include a linked data pair that indicates data structure 550 was compared to data structure 422 and that data structure 550 is 55% similar to data structure 422. Likewise, analysis entries 602 may further include a linked data pair that indicates data structure 550 was compared to data structure 424 and that data structure 550 is 45% similar to data structure 424. Likewise, analysis entries 602 may further include a linked data pair that indicates data structure 550 was compared to data structure 426 and that data structure 550 is 42% similar to data structure 426. Likewise, analysis entries 602 may further include a linked data pair that indicates data structure 550 was compared to data structure 428 and that data structure 550 is 30% similar to data structure 428. Likewise, analysis entries 602 may further include a linked data pair that indicates data structure 550 was compared to data structure 430 and that data structure 550 is 11% similar to data structure 430. The relative degree of similarity between the associated ancestral data structure to the contemporary data structure relative to the other degrees of contextual similarity between the rest of the ancestral data structures to the contemporary data structure may serve as the ranking of the ancestral images to the input contemporary image.

Figure 7:
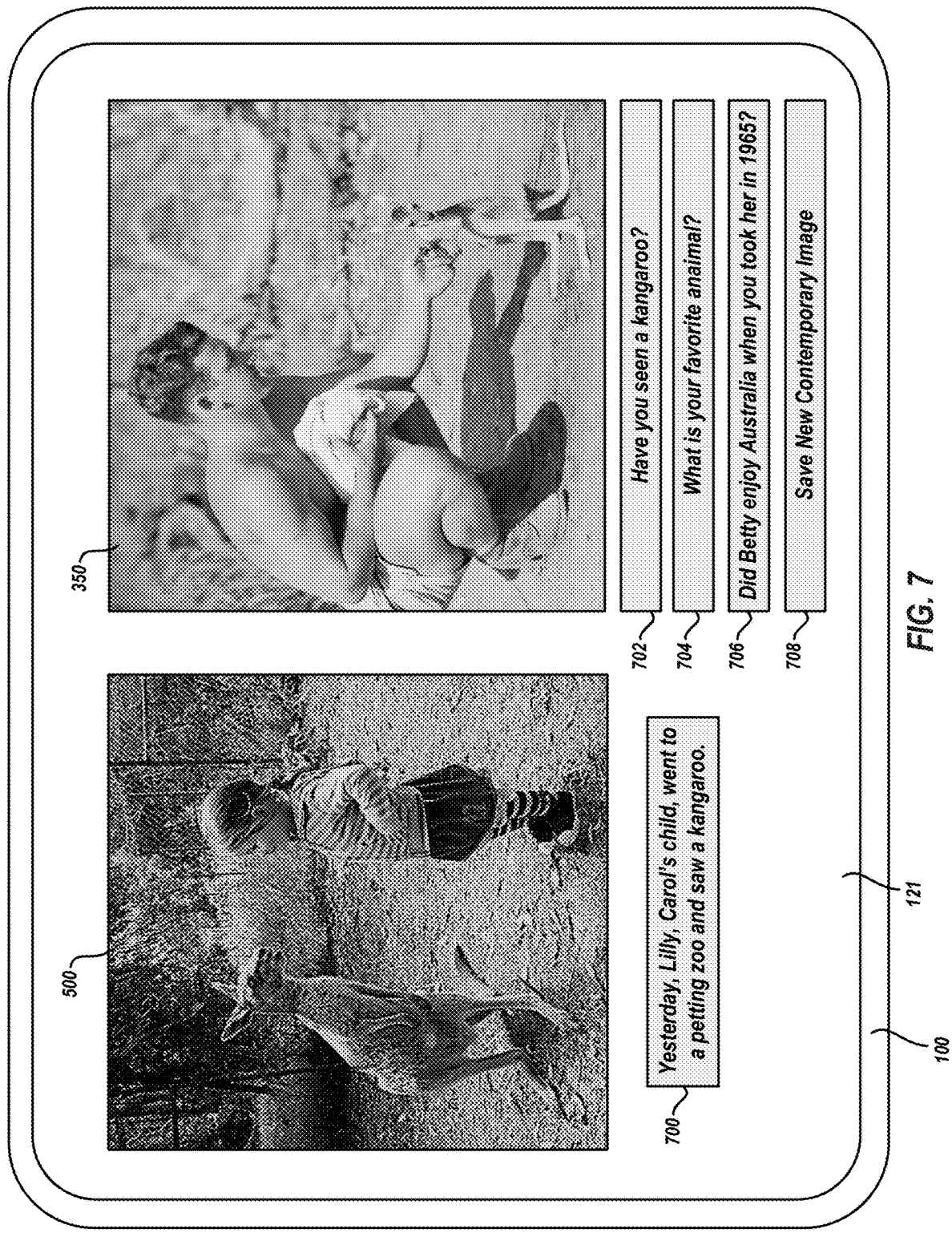
FIG. 7 depicts simultaneously displaying a contemporary input image with the most contextually similar ancestral image, according to one or more embodiments of the present invention.

FIG. 7 depicts simultaneously displaying contemporary input image 500 with the most contextually similar ancestral image 305. For example, contemporary input image 500 is simultaneously displayed with the most contextually similar ancestral image 305 within a graphic user interface (GUI) upon touch screen 121 of computer 100 by processor 101 evoking image display module 216. The techniques used to simultaneously display both contemporary input image 500 and the most contextually similar ancestral image 305 within the GUI, as described herein, generally improve the speed and/or accuracy with which a user of computer 100 accomplishes the tasks of retrieving a new contemporary input image (if needed) and determining the most contextually similar ancestral image, amongst numerous ancestral images, to the new contemporary input image. Because such techniques improve the usability, speed, and/or accuracy with which a user of computer 100 accomplishes such tasks, the disclosed techniques serve as an improvement in computer-related technology.

A contextual description 700 of contemporary image 500 may be provided by prompt module 224. Description 700 is an example of a description prompt that includes a description of one or more entities depicted within an image. For example, a GUI object with the contextual description 700 may be displayed upon the touch screen 121 or audio that speaks the contextual description 700 may be provided by speaker 123. Contextual description 700 may be generated by natural language processing module 222 utilizing the contemporary image data structure 550 as an input. The natural language processing module 222 may determine the persons or person of the contemporary image via the facial analysis entries 562, via the external metadata entries 564; may determine the activity of the contemporary image via the image caption entries 560, via the external metadata entries 564, via the scene entries 556; may determine the location, time, dated, etc. of the scene via metadata entry 554. The natural language processing module 222 may determine the relationship of the persons or person of the contemporary image to the primary user via the relationship profile data structure 300. The natural language processing module 222 may generate the contextual description 700 from the perspective of the primary user.

Interactions of the primary user with the GUI or VUI associated with juxtaposer 170 may be monitored by interaction module 226. For example, interaction module 226 may include a gesture, click, or the like tracker that tracks manipulations of GUI objects to determine whether the primary user is interacting with the GUI. Interaction module 226 may include a conversation tracker that tracks voice and/or other audio to determine whether the primary user alone or the primary user in combination with another user is interacting with the VUI. Interaction module 226 may instruct prompt module 224 to output interaction prompts 702, 704, 706 to spur interaction, may instruct image display module 216 to display a next ranked ancestral image in place of ancestral image 350, and/or may instruct prompt module 224 to output a new image prompt 708 to store a new contemporary image within dataspace 206. Interaction prompts may include a query about one or more entities depicted within an image.

A GUI object with the interaction prompt 702, 704, 706 may be displayed upon the touch screen 121 or audio that speaks the interaction prompt 702, 704, 706 may be provided by speaker 123. Interaction prompt 702, 704, 706 may be generated by natural language processing module 222 utilizing the ancestral image data structure 400 as an input. The natural language processing module 222 may determine the persons or person of the ancestral image via the facial analysis entries 412, via the external metadata entries 414; may determine the activity of the ancestral image via the image caption entries 410, via the external metadata entries 414, via the scene entries 406; may determine the location, time, dated, etc. of the scene via metadata entry 404. The natural language processing module 222 may determine the relationship of the persons or person of the ancestral image to the primary user via the relationship profile data structure 300. The natural language processing module 222 may generate the interaction prompt description 702, 704, 706 from the perspective of the primary user or from the perspective of another user that is or is attempting to interact with the primary user.

A GUI object with the new image prompt 708 may be displayed upon the touch screen 121 of computer 100, or a different computer 100 (i.e. touch screen 121 of computer 180), relative to the computer 100 that may be used by the primary user, or audio that speaks the new image prompt 708 may be provided by speaker 123 of computer 100, or a different computer 180, relative to the computer 100 that may be used by the primary user. New image prompt 708 may be provided if interaction module 226 does not detect any interaction between the primary user and the VUI and/or GUI associated with juxtaposer 170 for a predetermined time threshold.

Figure 8:
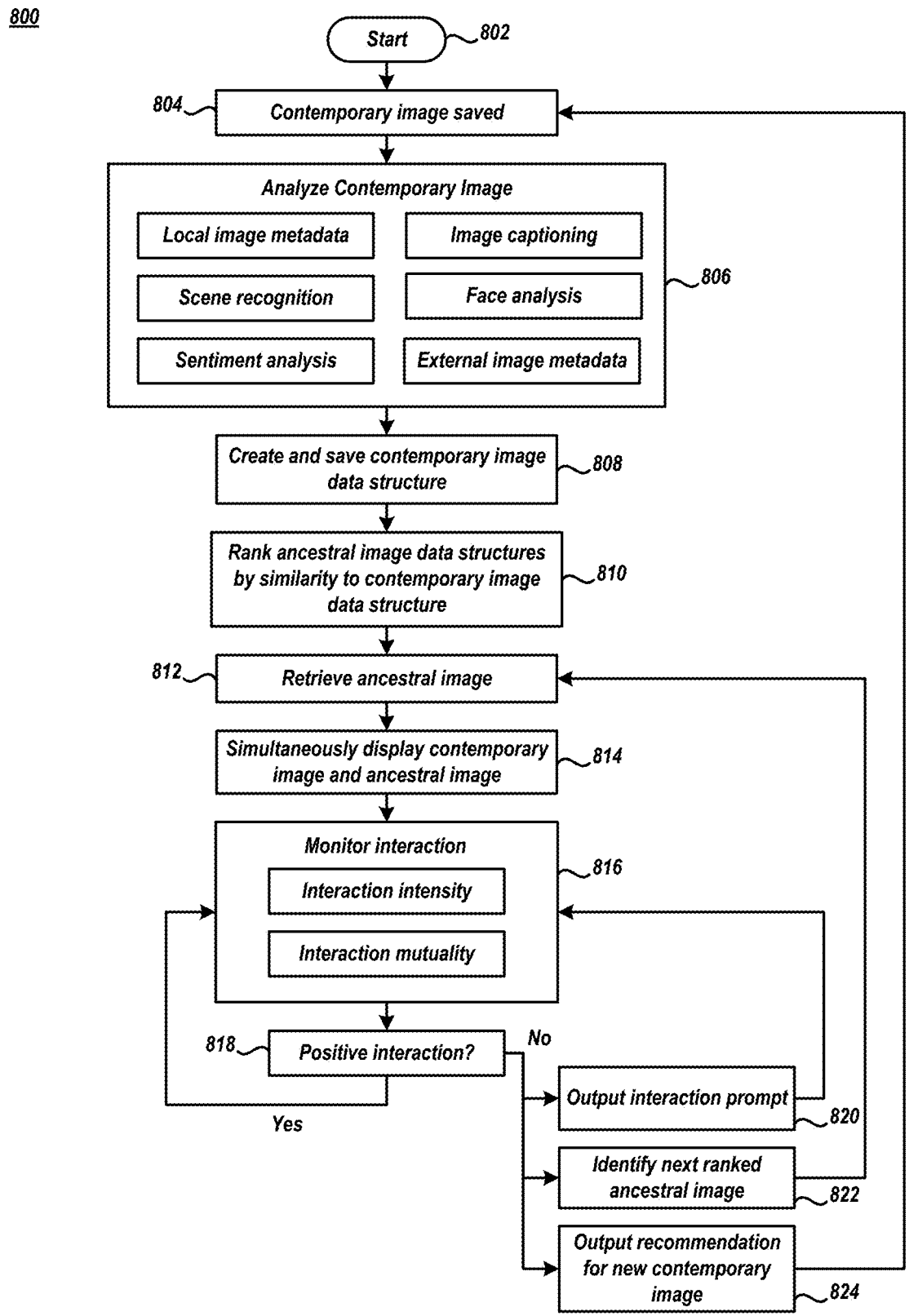
FIG. 8 illustrates an exemplary method of simultaneously displaying a contemporary input image with the most contextually similar ancestral image and monitoring elder interaction therewith, according to one or more embodiments of the present invention.

FIG. 8 illustrates an exemplary method 800 of simultaneously displaying a contemporary input image with a most contextually similar ancestral image and monitoring elder interaction. Method 800 may be utilized by processor 101 of computer 100 and/or 180, or the like when such processor(s) 101 evoke image juxtaposer 170 thus turning such computer 100 and/or 180, or the like into a particular machine configured to carry out such instructions. Method 800 utilizes a new contemporary image being saved within data space 206 as a triggering event to determine a contextually similar ancestral image. Dataspace 206 generally has an influx of contemporary images saved thereto, and because the contemporary images have a greater contextual and/or scene diversity that the ancestral images within data space 204, the utilization of a new contemporary image saved within dataspace 206 as a triggering event to juxtapose a contextually similar ancestral image results in a frequent juxtaposition of such images that spur intergenerational interaction inclusive of the elder primary user. Intergeneration interaction may increase due to a younger individual's tie to newly topical contemporary images and due to an elder's tie to memories associated with ancestral images that are contextually like the contemporary image.

Method 800 begins at block 802 and continues with image juxtaposer 170 detecting that a new contemporary image has been saved in contemporary dataspace 206 (block 804). For example, a portion of image juxtaposer 170 that detects new contemporary images is within memory 120 of computer 180 determines that contemporary image 500 has been saved in dataspace 206 local to computer 180. Computer 100 resultantly automatically retrieves image 500 from computer 180 and stores the contemporary image 500 within computer 100.

Method 800 continues with juxtaposer 170 analyzing the new contemporary image (block 806). Image analysis module 218 analyzes the new contemporary image. Image analysis module 218 may utilize relationship profile module 210 to determine the relationship of person or persons depicted in the new contemporary image to the primary user of computer 100. Image analysis module 218 may utilize image search module 212 to search the web to extract external meta data that is not local to the digital file of the contemporary image to determine contextual data of the new contemporary image. Image analysis module 218 may utilize image metadata module 214 to extract metadata local to the digital image file of the contemporary image to determine contextual data of the new contemporary image. Image analysis module 218 may further utilize image classification schemes, image segmentation schemes, image captioning schemes, or the like to determine contextual data of the new contemporary image.

Method 800 continues with juxtaposer generating and saving a contemporary image data structure associated with the new contemporary image (block 806). For example, image analysis module 218 analyzes contemporary image 500 and generates image data structure 550 from such analysis and saves the data structure 550 to dataspace 252. The contemporary image data structure may include an image identifier entry that links the data structure to a particular contemporary image, one or more local metadata entries that contain contextual data harvested from metadata local to the contemporary image by module 214, one or more image scene entries that include contextual data tags that describe one or more entities of the contemporary image, one or more image sentiment entries that include contextual data tags that describe the sentiment of one or more entities of the contemporary image, one or more image caption entries that include a text description of one or more entities of the contemporary image, one or more facial analysis entries which that include the identity of one or more persons depicted within the contemporary image, and/or one or more external metadata entries that contain contextual data harvested from metadata external to the contemporary image by module 212.

Method 800 may continue with comparing the contemporary image data structure with each of the preexisting ancestral image data structures and raking the ancestral image data structures based upon similarity to the contemporary image data structure (block 810). Data structure comparison module 220 may compare the contemporary image data structure 550 to each of the ancestral data structures 400, 420, 422, 424, 426, 428, and 430 to determine the quantity of the same contextual data within the entries of the contemporary image data structure 550 to the entries of each of the preexisting ancestral data structures 400, 420, 422, 424, 426, 428, and 430.

Data structure comparison module 220 may compare the contemporary image data structure 550 to each of the ancestral data structures 400, 420, 422, 424, 426, 428, and 430 to determine if tags within the scene and/or sentiment entries of the contemporary image data structure have a genus species relationship to the tags within the scene and/or sentiment entries of each of the ancestral data structures. Data structure comparison module 220 may compare the contemporary image data structure 550 to each of the ancestral data structures 400, 420, 422, 424, 426, 428, and 430 to determine the degree of similarly between text descriptions within the image caption entries of the contemporary image data structure 550 to the text descriptions within the image caption entries of the ancestral image data structures 400, 420, 422, 424, 426, 428, and 430. For example, data structure comparison module 220 determines whether the text descriptions have a part of speech, a syntactic, and/or a semantic similarly.

Data structure comparison module 220 may compare the contemporary image data structure 550 to each of the ancestral data structures 400, 420, 422, 424, 426, 428, and 430 to determine the degree of relationship between the identity of person or persons as per the facial analysis entries within the contemporary image data structure 550 to the identity of person or persons as per the facial analysis entries within the ancestral data structures 400, 420, 422, 424, 426, 428, and 430. For example, a zero-degree person to the primary user may be denoted as most similar, first-degree person next similar, second-degree person next similar, miscellaneous person next similar, or the like.

Data structure comparison module 220 may subsequently generate a comparison data structure 600 that ranks the ancestral images 350, 352, 356, 358, 360, and 362 to the input contemporary image 500 based upon the degree of similar between the contemporary image data structure 550 and the respective data structures 400, 420, 422, 424, 426, 428, and 430.

Method 800 may continue with determining and retrieving the most contextually similar ancestral image to the contemporary image (block 812). For example, image analysis module 218 identifies the ancestral image that is associated with the highest ranked data structure based upon its similar to the contemporary image data structure as the most contextually similar ancestral image to the contemporary image. Juxtaposer 170 may retrieved the associated ancestral image from dataspace 204. For example, juxtaposer 170 retrieves ancestral image 350, the most contextually similar ancestral image as denoted by data structure 600, from dataspace 204.

Method 800 may continue with simultaneously displaying the contemporary image and the applicable ancestral image. For example, the processor 101 or GPU within computer 100 may display the contemporary image 500 and ancestral image 350 upon touch screen 121 of computer 100, during a first iteration cycle.

Method 800 may continue with monitoring interaction of the primary user (block 816). For example, interaction module 226 may include a gesture, click, or the like tracker that tracks manipulations of GUI objects to determine whether the primary user is interacting with the GUI displayed upon touch screen 121of computer 100. Interaction module 226 may include a conversation tracker that tracks voice and/or other audio to determine whether the primary user alone or the primary user in combination with another user is interacting with the VUI of computer 100.

Method 800 may continue with determining whether the interaction of the primary user is positive (block 818). For example, a positive interaction may be a predetermined rate of primary user gestures, clicks, or the like; may be a predetermined rate of spoken words of the primary user; may be a predetermined rate of spoken words of the primary user interleaved with spoken words of another user; or the like. If the interaction is positive, method 800 may return to block 816. For example, if the actual rate of primary user gestures, click, etc. are greater than the predetermined rate of primary user gestures, clicks, or the like; if the actual rate of spoken words by the primary user is above the predetermined rate of spoken words of the primary user; if the actual mutuality of the conversation between the primary user and the other user is above the predetermined rate of spoken words of the primary user interleaved with spoken words of another user, a positive interaction is determined and method 800 pauses until the interaction is no longer positive.

If the interaction is no longer positive, method 800 may continue with outputting an interaction prompt (block 820), with outputting a next ancestral image that is next most similar to the contemporary image (block 822), and/or outputting a next contemporary image prompt for to save a new contemporary image to dataspace 206 (block 824). For example, interaction module 226 may instruct prompt module 224 to output interaction prompts 702, 704, 706 to spur interaction, may instruct image display module 216 to display a next ranked ancestral image in place of ancestral image 350, and/or may instruct prompt module 224 to output a new image prompt 708 to prompt for a new contemporary image to be stored within dataspace 206. Method 800 may continue from block 820 to block 816, may continue from block 822 to block 812 where the next most contextually similar ancestral block is determined in a next iteration cycle, and may continue from block 824 to block 804.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of simultaneously displaying an ancestral image and a contemporary image comprising:

analyzing, with a first client computer, a plurality of ancestral images stored within an ancestral dataspace local to first client computer to generate a plurality of ancestral image data structures, wherein one ancestral data structure is linked to one ancestral image, and wherein each of the ancestral image data structures comprises contextual data of one or more entities depicted within the linked ancestral image;

subsequently detecting, with a server computer, that a contemporary image has been stored within a contemporary image dataspace local to a second computer connected to the first client computer and to the server computer by a network;

resultantly obtaining, with the first client computer, the contemporary image;

analyzing, with the first client computer, the contemporary image to generate a linked contemporary image data structure comprising contextual data of one or more entities depicted within the contemporary image;

ranking, with the first client computer, the plurality of ancestral images based upon degree of similarity between the ancestral image data structures and the contemporary image data structure;

identifying, with the first client computer, an ancestral image linked to an ancestral image data structure with the highest degree of similarity to the contemporary image data structure;

simultaneously displaying the contemporary image and the ancestral image within a graphical user interface upon a screen of the first client computer;

generating, with the first client computer, a description prompt comprising a description of one or more entities depicted within contemporary image from the contemporary image data structure;

generating, with the first client computer, an interaction prompt comprising a query about one or more entities depicted within the ancestral image from the ancestral image data structure;

providing, with the first client computer, the description prompt and the interaction prompt;

subsequent to providing the interaction prompt, monitoring, with a voice user interface (VUI) of the first client computer, vocal audio of a user of the first client computer that is received by a microphone of the first client computer to determine whether the user of the first client computer vocally responds to the interaction prompt query about the one or more entities depicted within the ancestral image; and determining, with the VUI of the first client computer, that the user of the first client computer does not adequately vocally respond to the interaction prompt query about the one or more entities depicted within the ancestral image and resultantly displaying, within a graphical user interface upon a screen of the second client computer, a prompt to store a new contemporary image within the contemporary image dataspace.

2. The method of claim 1, wherein each of the ancestral image data structures comprise a plurality of contextual data scene tags that identify an entity within the linked ancestral image and wherein the contemporary image data structure comprises a plurality of contextual data scene tags that identify an entity within the linked contemporary image.

3. The method of claim 1, wherein each of the ancestral image data structures comprise an image caption tag that captions the linked ancestral image and wherein the contemporary image data structure comprises an image caption tag that captions the linked contemporary image.

4. The method of claim 1, wherein each of the ancestral image data structures comprise a facial analysis tag that identifies a person depicted in the linked ancestral image and wherein the contemporary image data structure comprises facial analysis tag that identifies a person depicted in the ancestral image.

5. The method of claim 1, wherein each of the ancestral image data structures comprise a metadata entry comprising metadata local to the linked ancestral image and wherein the contemporary image data structure comprises a metadata entry comprising metadata local to the linked contemporary image.

6. The method of claim 1, further comprising:
generating, with the first client computer, a relationship profile data structure comprising a first entry associated with a first person, a second entry associated with a second person, and a pointer between the first entry and the second entry that identifies a relation between the first person to the second person.

7. The method of claim 1, further comprising:
identifying, with the first client computer, a next ancestral image linked to an ancestral image data structure with a next highest degree of similarity to the contemporary image data structure; and
displaying, within the graphical user interface upon the screen of the first client computer, the next ancestral image in place of the ancestral image.

8. A computer program product for simultaneously displaying an ancestral image and a contemporary image, the computer program product comprising a computer readable storage medium having program instructions embodied therewith, the program instructions readable by:
a first client computer to analyze a plurality of ancestral images stored within an ancestral dataspace local to the first client computer and generate a plurality of ancestral image data structures, wherein one ancestral data structure is linked to one ancestral image, and wherein each of the ancestral image data structures comprises contextual data of one or more entities depicted within the linked ancestral image;
a server computer to subsequently detect that a contemporary image has been stored within a contemporary image dataspace local to a second client computer connected to the server computer and to the first client computer by a network;
the first client computer to resultantly obtain the contemporary image;
the first client computer to analyze the contemporary image and generate a linked contemporary image data structure comprising contextual data of one or more entities depicted within the contemporary image;
the first client computer to rank the plurality of ancestral images based upon degree of similarity between the ancestral image data structures and the contemporary image data structure;
the first client computer to identify an ancestral image linked to an ancestral image data structure with the highest degree of similarity to the contemporary image data structure;
the first client computer to simultaneously display the contemporary image and the ancestral image within a graphical user interface upon a screen of the first client computer;
the first client computer to generate a description prompt comprising a description of one or more entities depicted within contemporary image from the contemporary image data structure;
the first client computer to generate an interaction prompt comprising a query about one or more entities depicted within the ancestral image from the ancestral image data structure;
the first client computer to provide the description prompt and the interaction prompt;
the first client computer to monitor, with a voice user interface (VUI) of the first client computer, vocal audio of a user of the first client computer that is received by a microphone of the first client computer to determine whether the user of the first client computer vocally responds to the interaction prompt query about the one or more entities depicted within the ancestral image;
the first client computer to determine that the user of the first client computer does not adequately vocally respond to the interaction prompt query about the one or more entities depicted within the ancestral image; and
the second client computer to resultantly display, within a graphical user interface upon a screen of the second client computer, a prompt to store a new contemporary image within the contemporary image dataspace.

9. The computer program product of claim 8, wherein each of the ancestral image data structures comprise a plurality of contextual data scene tags that identify an entity within the linked ancestral image and wherein the contemporary image data structure comprises a plurality of contextual data scene tags that identify an entity within the linked contemporary image.

10. The computer program product of claim 8, wherein each of the ancestral image data structures comprise an image caption tag that captions the linked ancestral image and wherein the contemporary image data structure comprises an image caption tag that captions the linked contemporary image.

11. The computer program product of claim 8, wherein each of the ancestral image data structures comprise a facial analysis tag that identifies a person depicted in the linked ancestral image and wherein the contemporary image data structure comprises facial analysis tag that identifies a person depicted in the ancestral image.

12. The computer program product of claim 8, wherein each of the ancestral image data structures comprise a metadata entry comprising metadata local to the linked ancestral image and wherein the contemporary image data structure comprises a metadata entry comprising metadata local to the linked contemporary image.

13. The computer program product of claim 8, wherein the program instructions are readable by:
the first client computer to generate a relationship profile data structure comprising a first entry associated with a first person, a second entry associated with a second person, and a pointer between the first entry and the second entry that identifies a relation between the first person to the second person.

14. The computer program product of claim 8, wherein the program instructions are readable by:
the first client computer to identify a next ancestral image linked to an ancestral image data structure with a next highest degree of similarity to the contemporary image data structure; and
the first client computer to display the next ancestral image in place of the ancestral image.

15. A computer system comprising:
a first client computer that analyzes a plurality of ancestral images stored within an ancestral dataspace local to the first client computer and that generates a plurality of ancestral image data structures, wherein one ancestral data structure is linked to one ancestral image, and wherein each of the ancestral image data structures comprises contextual data of one or more entities depicted within the linked ancestral image;

a server computer that detects that a contemporary image has been stored within a contemporary image dataspace local to a second client computer connected to the server computer and to the first client computer by a network;

the first client computer that obtains the contemporary image;

the first client computer that analyzes the contemporary image and that generates a linked contemporary image data structure comprising contextual data of one or more entities depicted within the contemporary image;

the first client computer that ranks the plurality of ancestral images based upon degree of similarity between the ancestral image data structures and the contemporary image data structure;

the first client computer that identifies an ancestral image linked to an ancestral image data structure with the highest degree of similarity to the contemporary image data structure;

the first client computer that simultaneously displays the contemporary image and the ancestral image within a graphical user interface upon a screen of the first client computer;

the first client computer that generates a description prompt comprising a description of one or more entities depicted within contemporary image from the contemporary image data structure;

the first client computer that generates an interaction prompt comprising a query about one or more entities depicted within the ancestral image from the ancestral image data structure;

the first client computer that provides the description prompt and the interaction prompt;

the first client computer that monitors, with a voice user interface (VUI) of the first client computer, vocal audio of a user of the first client computer that is received by a microphone of the first client computer to determine whether the user of the first client computer vocally responds to the interaction prompt query about the one or more entities depicted within the ancestral image;

the first client computer that determines that the user of the first client computer does not adequately vocally respond to the interaction prompt query about the one or more entities depicted within the ancestral image; and the second client computer that resultantly displays, within a graphical user interface upon a screen of the second client computer, a prompt to store a new contemporary image within the contemporary image dataspace.

16. The computer system of claim 15, wherein each of the ancestral image data structures comprise a plurality of contextual data scene tags that identify an entity within the linked ancestral image and wherein the contemporary image data structure comprises a plurality of contextual data scene tags that identify an entity within the linked contemporary image.

17. The computer system of claim 15, wherein each of the ancestral image data structures comprise an image caption tag that captions the linked ancestral image and wherein the contemporary image data structure comprises an image caption tag that captions the linked contemporary image.

18. The computer system of claim 15, wherein each of the ancestral image data structures comprise a facial analysis tag that identifies a person depicted in the linked ancestral image and wherein the contemporary image data structure comprises facial analysis tag that identifies a person depicted in the ancestral image.

19. The computer system of claim 15, wherein each of the ancestral image data structures comprise a metadata entry comprising metadata local to the linked ancestral image and wherein the contemporary image data structure comprises a metadata entry comprising metadata local to the linked contemporary image.

20. The computer system of claim 15, further comprising:
the first client computer that generates a relationship profile data structure comprising a first entry associated with a first person, a second entry associated with a second person, and a pointer between the first entry and the second entry that identifies a relation between the first person to the second person.

* * * * *